United States Patent
Brume et al.

(10) Patent No.: US 8,700,824 B2
(45) Date of Patent: Apr. 15, 2014

(54) ADJUSTABLE BUFFER SIZING FOR CONCURRENT WRITING TO TAPE

(75) Inventors: Shawn Owen Brume, Tucson, AZ (US); Fahnmusa Christian Jangaba, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 13/344,378

(22) Filed: Jan. 5, 2012

(65) Prior Publication Data

US 2013/0179607 A1   Jul. 11, 2013

(51) Int. Cl.
  *G06F 3/00* (2006.01)
  *G06F 11/00* (2006.01)

(52) U.S. Cl.
  USPC ............................................ 710/56; 714/6.11

(58) Field of Classification Search
  USPC ............................................ 710/56; 714/6.11
  See application file for complete search history.

(56) References Cited

U.S. PATENT DOCUMENTS

| | | | |
|---|---|---|---|
| 5,754,887 A * | 5/1998 | Damron et al. | 710/39 |
| 6,101,059 A | 8/2000 | Wong et al. | |
| 6,700,732 B1 * | 3/2004 | Indeck | 360/77.12 |
| 7,054,790 B1 * | 5/2006 | Rich | 702/186 |
| 7,746,588 B2 | 6/2010 | Koeppe et al. | |
| 2002/0095536 A1 * | 7/2002 | Emberty et al. | 710/65 |
| 2005/0108538 A1 * | 5/2005 | Howard et al. | 713/176 |
| 2008/0162813 A1 | 7/2008 | Haustein et al. | |
| 2010/0265612 A1 | 10/2010 | Jaquette | |
| 2010/0299477 A1 | 11/2010 | Brume et al. | |
| 2011/0103245 A1 * | 5/2011 | Lu | 370/252 |

* cited by examiner

*Primary Examiner* — Farley Abad
(74) *Attorney, Agent, or Firm* — John H. Holcombe

(57) ABSTRACT

Data is buffered for concurrent writing to tape. For a magnetic tape drive having a magnetic head with multiple sets of transducers; a drive mechanism configured to pass a magnetic tape past the magnetic head; interfaces from two different hosts; and at least one buffer configured to buffer data; and a control; the buffering comprises receiving data from two different hosts at the interfaces; buffering the received data in separate buffer space of the buffer(s) associated with each host, and adjustably size the separate buffer space for each host in accordance with a data transfer rate of the host associated with the separate buffer space; and concurrently writing data from the separate buffer spaces with the magnetic head to separate partitions of the magnetic tape.

20 Claims, 6 Drawing Sheets

ADJUSTABLE BUFFER SIZING FOR CONCURRENT WRITING TO TAPE

DOCUMENT INCORPORATED BY REFERENCE

Commonly assigned U.S. patent application Ser. No. 12/469,622, filed May 20, 2009, is incorporated for its showing of a concurrent writing to tape.

FIELD OF THE INVENTION

This invention relates to tape drives, and more particularly to writing data to magnetic tape.

BACKGROUND OF THE INVENTION

The data rates of tape drives, such as magnetic tape drives, have increased substantially and may exceed the rate at which hosts can supply data to the tape drive. The incorporated '622 application addresses this issue by concurrently writing the data from at least two hosts to the magnetic tape using multiple transducers.

SUMMARY OF THE INVENTION

Methods, controllers for magnetic tape drives, magnetic tape drives, and computer program products are provided for buffering data for concurrent writing to magnetic tape.

In one embodiment, a magnetic tape drive comprises a magnetic head having multiple sets of transducers; a drive mechanism configured to pass a magnetic tape past the magnetic head; interfaces with respect to two different hosts; at least one buffer configured to buffer data; and a control. In the magnetic tape drive, the following is performed:

receiving data from two different hosts at the interfaces;

buffering the received data in separate buffer space of the buffer(s) associated with each host, and adjustably size the separate buffer space for each host in accordance with a data transfer rate of the host associated with the separate buffer space; and concurrently writing data from the separate buffer spaces with the magnetic head to separate partitions of the magnetic tape.

In a further embodiment, the buffer space adjustable sizes are based on expected relative data transfer rates of the respective hosts.

In a still further embodiment, the expected relative data transfer rates are determined from preceding actual incoming data transfer rates of the hosts.

In another embodiment, the expected relative data transfer rates are determined from a previous portion of the concurrent write operations.

In a further embodiment, the control makes the determination periodically during the concurrent write operations; and conducts the adjustable sizing as the result of the determination.

In another embodiment, the control additionally conducts command error recovery failure handling for the buffering and concurrently writing steps based on timeout values for commands of the hosts.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
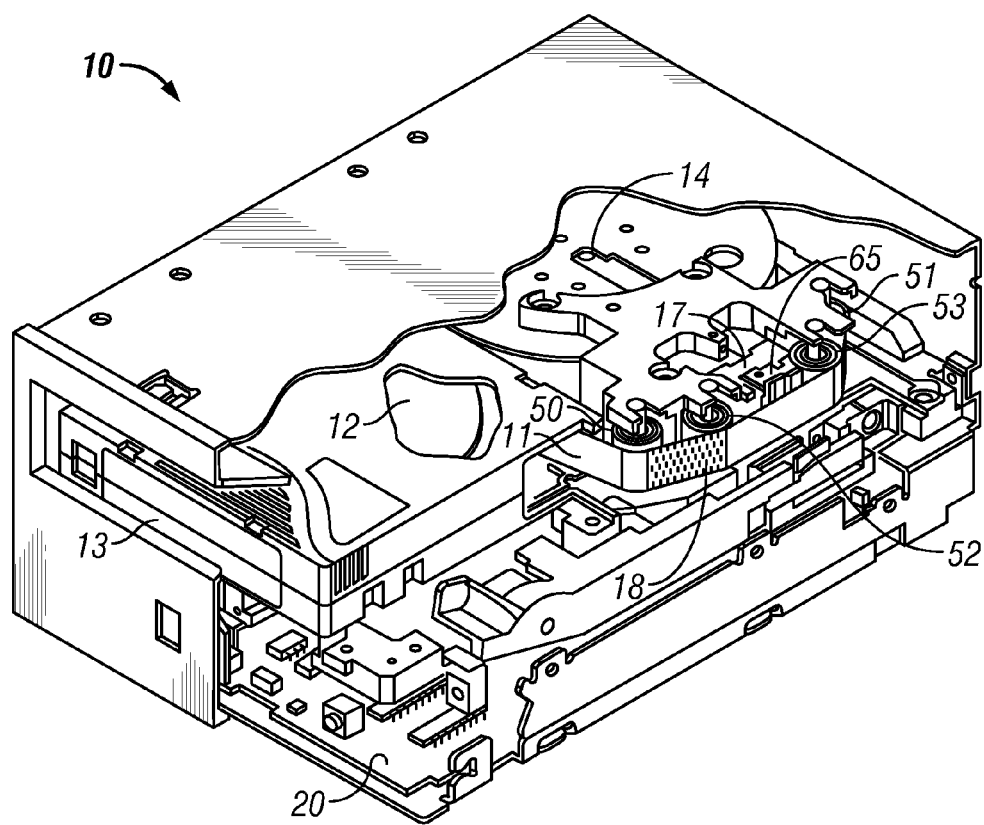
FIG. 1 is a partially cut away view of an exemplary tape drive with a tape cartridge and magnetic tape which may implement the present invention.

FIG. 1 illustrates an example of a tape drive 10, which may comprise a magnetic tape data storage drive which writes data 18 to and reads data from an elongate tape 11 which may comprise magnetic tape data storage media. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive.

The tape drive moves the magnetic tape media 11 in the longitudinal direction across a read/write and servo tape head 65. The tape head may be supported and laterally moved by an actuator 17 of a track following servo system. The magnetic tape media is supported by roller tape guides 50, 51, 52, 53, while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

Figure 2:
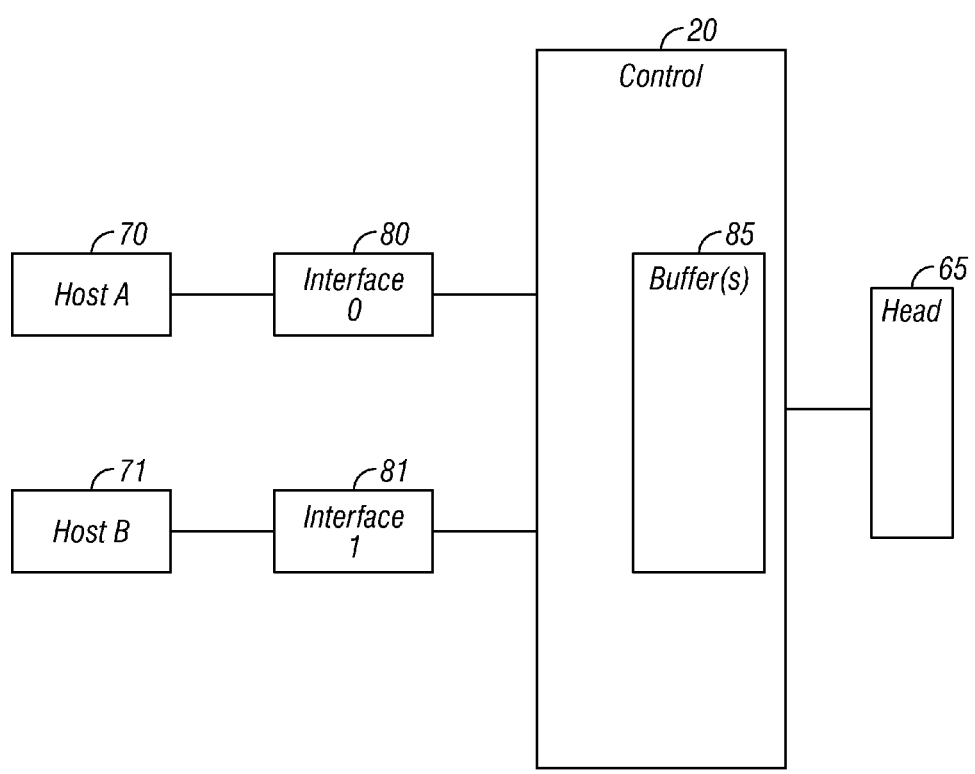
FIG. 2 is a block diagram of host systems and the tape drive of FIG. 1.

Referring to FIGS. 1 and 2, a control 20 of the tape drive 10 operates the drive to move the tape media 11 across the read/write and servo tape head 65, and to control the operation of the servo system to move the actuator 17 to maintain alignment of the tape head 65 to compensate for lateral movement of the tape media, for example using a track following servo system and servo tracks that may exist on the tape media which are read by the servo portion of the read/write and servo tape head 65. The control 20 additionally provides the data handling for both normal writing and reading of data from the tape media, and for concurrent writing to the tape media.

As pointed out by the incorporated '477 publication, multi-host concurrent writing allows two or more hosts to simultaneously write data to tape, thereby leveraging the full potential of the tape drive. Multi-host concurrent writing allows two or more hosts to perform writes on a single tape drive at the same time. In the example of two hosts 70 and 71, each host supplies its commands and data via ports or interfaces 80 and 81, and in accordance with the present invention, the control 20 provides the data to buffer 85.

Figure 3:
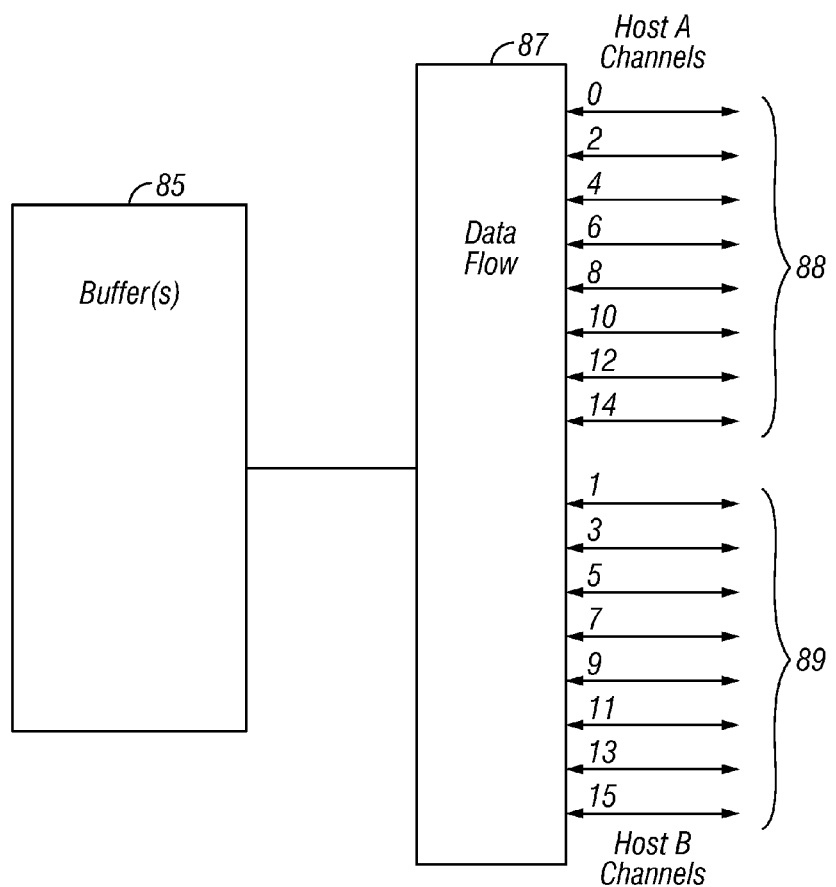
FIG. 3 is a diagrammatic illustration of the buffer(s) and data flow of the tape drive of FIG. 1.

Referring additionally to FIG. 3, the read/write head 65 traces "wraps" of data along the tape media 11. The tape drive control 20 comprises data flow logic 87 to simultaneously provide the data of each host to a dedicated separate set of channels 88, 89 which supply write data to separate collections of write elements of the head 65. The write elements of the head 65 write logical stripes of data within a wrap. In the example of two hosts, two stripes thereby comprise a wrap.

The '477 publication is incorporated for examples of concurrent writing to tape.

In the example of two host systems 70, 71, the tape 11 is essentially split into two halves, one half for each host system. For example, in a drive with 16 data channels 88, 89, 8 channels can be dedicated for data of each host system.

The present invention solves the issue of hosts that may or may not supply data at the same data rates to be used for concurrent writing.

Figure 4:
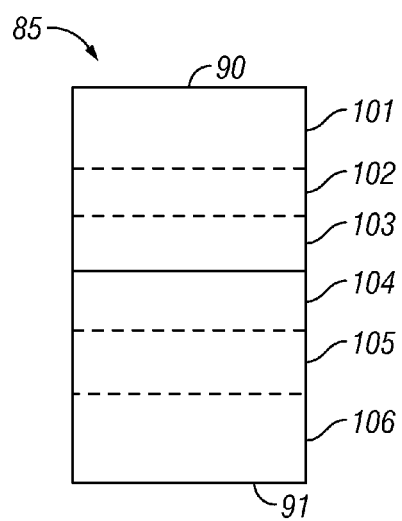
FIG. 4 is a diagrammatic illustration of the buffer(s) of the tape drive of FIG. 1.

Referring additionally to FIG. 4, buffer 85 may comprise a single buffer or a grouping of a number of buffers or buffer segments. Data is received from two different hosts 70, 71 at the interfaces 80, 81, and the received data is buffered 85 in separate buffer space or partition 90, 91 of the buffer(s) 85 associated with each host. The size of the separate buffer space 90, 91 for each host is adjusted in accordance with a data transfer rate of the host associated with the separate buffer space. The data is concurrently written from the separate buffer spaces 90, 91 with the magnetic head 65 to separate partitions of the magnetic tape 11.

In one example, the buffer 85 is filled with data until it meets a target level or target level of each of the spaces or partitions. When both hosts meet their target levels, data is flushed out and written to the tape 11 so that the hosts don't have to stop sending data to the drive. The intention is to keep the throughput very high.

One host can transfer data to the drive at a faster pace than the other and this effect is constantly changing between the hosts. Thus, on the next transfer the control 20 adjusts the size of the buffer 90, 91 for each host based on the data transfer rates, giving less space to the slower host and more space to the faster host. For example, in FIG. 4, the transfer is one in which the control 20 has no previous knowledge of the data rates of host A 70 or of host B 71, so that the buffer 85 is evenly split as a default.

Figure 5:
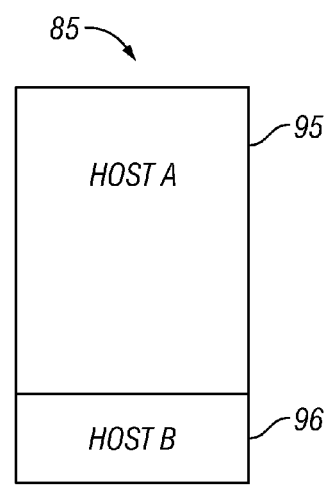
FIG. 5 is a diagrammatic illustration of the buffer(s) of the tape drive of FIG. 1.

In FIG. 5, based on previous transfers, host A 70 was much faster than host B 71, so the buffer 85 has been adjusted by control 20 to give host A more space, shown as partition 95, and host B less space, shown as partition 96, and the target levels adjusted accordingly. When data transfer begins and both hosts have reached their new target levels, data will be written to tape.

In FIG. 3, the data flow 87 controls the concurrent write operation, and, should one partition 90, 91 of the buffer 85 become empty, the data flow will continue to write data from the other buffer partition to the other partition of the tape 11, streaming until new data is supplied to the empty partition of the buffer. At the time the emptied buffer partition is again being filled, the control 20 will determine if it can start writing without an ERP (error recovery procedure), or whether it has to recover to a point on tape (conduct an ERP).

Referring to FIG. 4, to facilitate the buffer size adjustments, the buffer or buffers 85 may be arranged in segments. For example, 6 segments 101, 102, 103, 104, 105 and 106 may be provided. Thus, for example, after initially starting at equally sized partitions where segments 101, 102 and 103 are allocated to host A, and segments 104, 105 and 106 are allocated to host B, host B may provide data at a somewhat faster pace than host A, with the result that, at the next data transfer, segment 103 is allocated instead to host B. Therefore, the partition assigned to host A is segments 101 and 102, and the partition assigned to host B is segments 103, 104, 105 and 106.

The buffer space sizes adjustments are based on expected relative data transfer rates of the respective hosts 70, 71. In one embodiment, the expected relative data transfer rates are determined from preceding actual incoming data transfer rates of the hosts, for example during a previous concurrent write operation of the same hosts. In another embodiment, the expected relative data transfer rates are determined from a previous portion of the concurrent write operations. As an example, the control makes the determination periodically during the concurrent write operations; and conducts the adjustable sizing as the result of the determination at a point where the concurrent write operation is temporarily stopped or paused, for example when one host stops sending data and then resumes.

Figure 6:
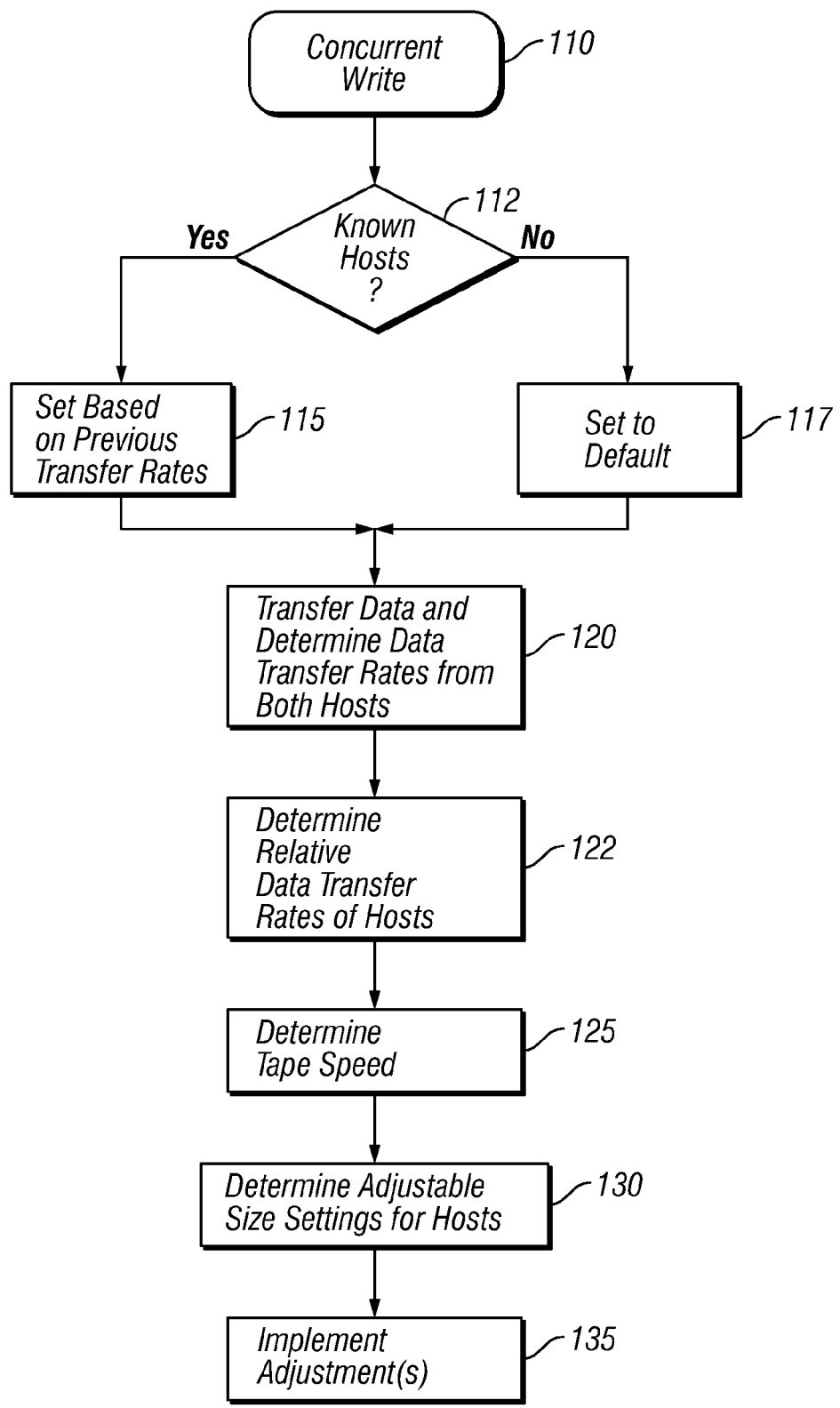
FIG. 6 is a flow chart depicting an exemplary method of operating the system of FIGS. 1 and 2.

FIG. 6 illustrates an example of the adjustment of process for a concurrent write 110. Referring to FIGS. 2, 3, 4 and 6, in step 112, the control 20 determines whether the host systems are a known pairing of hosts. If so, the control, in step 115, sets the buffer sizes for the hosts 70 and 71 based on the previous transfer rates for that pair of hosts. If the host pairing is new, in step 117, the control sets the buffer sizes for the hosts 70 and 71 to a default setting, for example at equal size for each host.

In step 120, data is transferred by the host systems to the interfaces 80, 81 and to the buffer(s) 85. When the target levels for the host systems are reached, the control, via data flow 87, provides the data to the dedicated channels 88, 89 for concurrent writing to the tape 11. During step 120, the control 20 determines the data transfer rates from both hosts 70 and 71. As an example, the control averages the data transfer rates over a defined period, or over the current data transfer operation. In step 122, the control 20 determines the relative data transfer rates of the hosts.

In one embodiment, the control, in step 125, determines a suitable tape speed from the host transfer rates of step 120. In one example, the tape speed is determined from the fastest host data transfer rate so as to insure that the host does not overfill the buffer 85 and have to stop the data transfer. Alternatively, the speed is determined from the slowest host data transfer rate to insure that the tape does not have to be stopped.

In step 130, the control 20 determines the appropriate size settings for the host systems 70 and 71 based on the relative data transfer rates of step 122. For example, the relative data transfer rate of step 122 may indicate that host A 70 was much faster than host B 71. As the result, control 20 may determine that the buffer 85 size is to be adjusted to give host A more space, shown as partition 95 of FIG. 5, and host B less space, shown as partition 96, and the target levels adjusted accordingly.

Referring to FIGS. 4 and 6, if the buffer or buffers 85 are arranged in segments, for example, 6 segments 101, 102, 103, 104, 105 and 106, the adjustment allocates various ones of the segments to each of the host systems. Thus, for example, after initially starting at equally sized partitions where segments 101, 102 and 103 are allocated to host A, and segments 104, 105 and 106 are allocated to host B, host B may provide data at a somewhat faster pace than host A, with the result that, at the next data transfer, segment 103 is allocated instead to host B. Therefore, the partition assigned to host A is segments 101 and 102, and the partition assigned to host B is segments 103, 104, 105 and 106.

As another example, if host B provided data at a much faster pace than host A in step 130 over the measurement period of steps 120 and 122, the partition assigned to host A would be segment 101, and the partition assigned to host B would be segments 102, 103, 104, 105 and 106.

As still another example, if host A provided data at a somewhat faster pace than host B over the measurement period of steps 120 and 122, the partition assigned to host A in step 130 would be segments 101, 102, 103 and 104, and the partition assigned to host B would be segments 105 and 106.

As another example, if host A provided data at a much faster pace than host B over the measurement period of steps 120 and 122, the partition assigned to host A would be segments 101, 102, 103, 104 and 105, and the partition assigned to host B would be segment 106.

When a suitable stop is made to the current data transfer or to the concurrent write, and then restarted, the control, in step 135, implements the adjustments of steps 125 and 130. The adjustment to tape speed may alternatively be made while the tape is moving.

Figure 7:
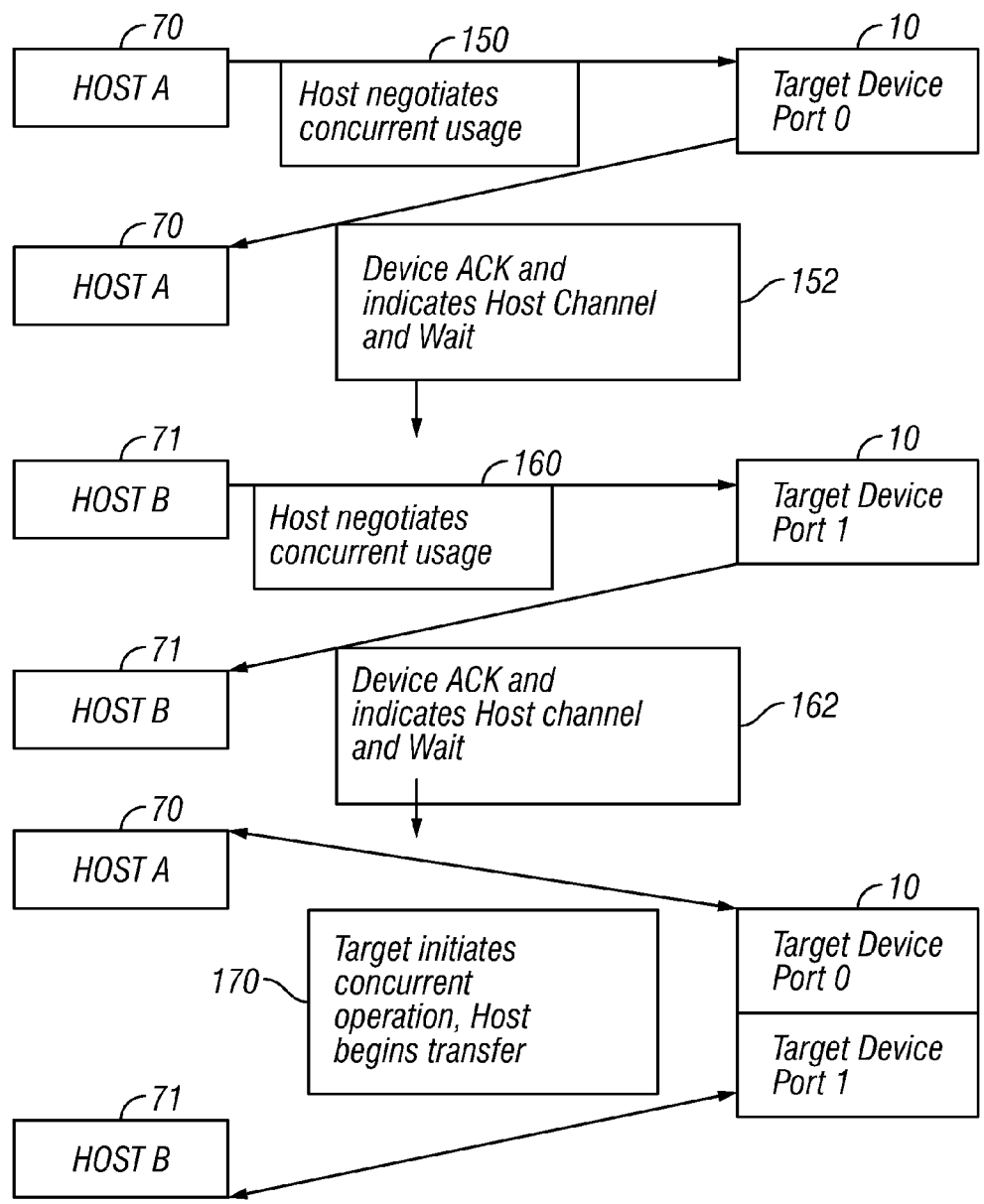
FIG. 7 is a diagrammatic illustration of various states of the system of FIGS. 1 and 2.

An example of the assignment of host systems to interface ports 80 and 81, to buffer 85 and to concurrent write channels 88 and 89 is illustrated in FIG. 7.

Referring to FIGS. 1, 3, 4 and 7, to affect the concurrent data transfer, the host negotiation must indicate to the drive that the hosts wish to use the concurrent writing method. As part of this negotiation, the drive will identify to the host system which host channel 88 or 89 is being assigned to each of the requesting hosts. When both channels have been assigned during negotiation with the respective host systems, the drive will indicate an initiation of transfer.

Thus, at step 150, host system A 70 negotiates concurrent usage with the target drive 10 and is assigned port 0 80. The control 20 of drive 10, in step 152, acknowledges the command, indicates to the host that it is assigned concurrent channel 88, and enters a wait state.

At step 160 (which may occur before, after, or simultaneously with step 150), host system B 71 negotiates concurrent usage with the target drive 10 and is assigned port 1 81. The control 20 of drive 10, in step 162, acknowledges the command, indicates to the host that it is assigned concurrent channel 89, and enters a wait state.

After both host systems have been acknowledged, at step 170, the target drive 10 initiates the concurrent operation and the host systems 70, 71 begin the data transfers using the respective interface ports 80, 81.

Referring to FIG. 6, in one embodiment, once the data transfers have begun for concurrent write, a primary method for determining the data transfer rates of step 120 is to measure the data rates from both connections during the first quarter of the tape length. During the first quarter of the tape operation, the control will operate the tape drive at the minimum data rate in step 125 unless it is determined that the data rate can be increased, based on the buffer flow management of the control indicating that Full conditions are occurring that hold off data transfer from both of the host systems. For example, four data rate adjustments can be made during the data rate assessment period in order to find the most efficient concurrent data rate. The concurrent data rate is indicated by the slowest host connection. Further, the concurrent writes may be conducted with standard write error correction, and should the error correction indicate failure, an error correction procedure will be initiated.

Figure 8:
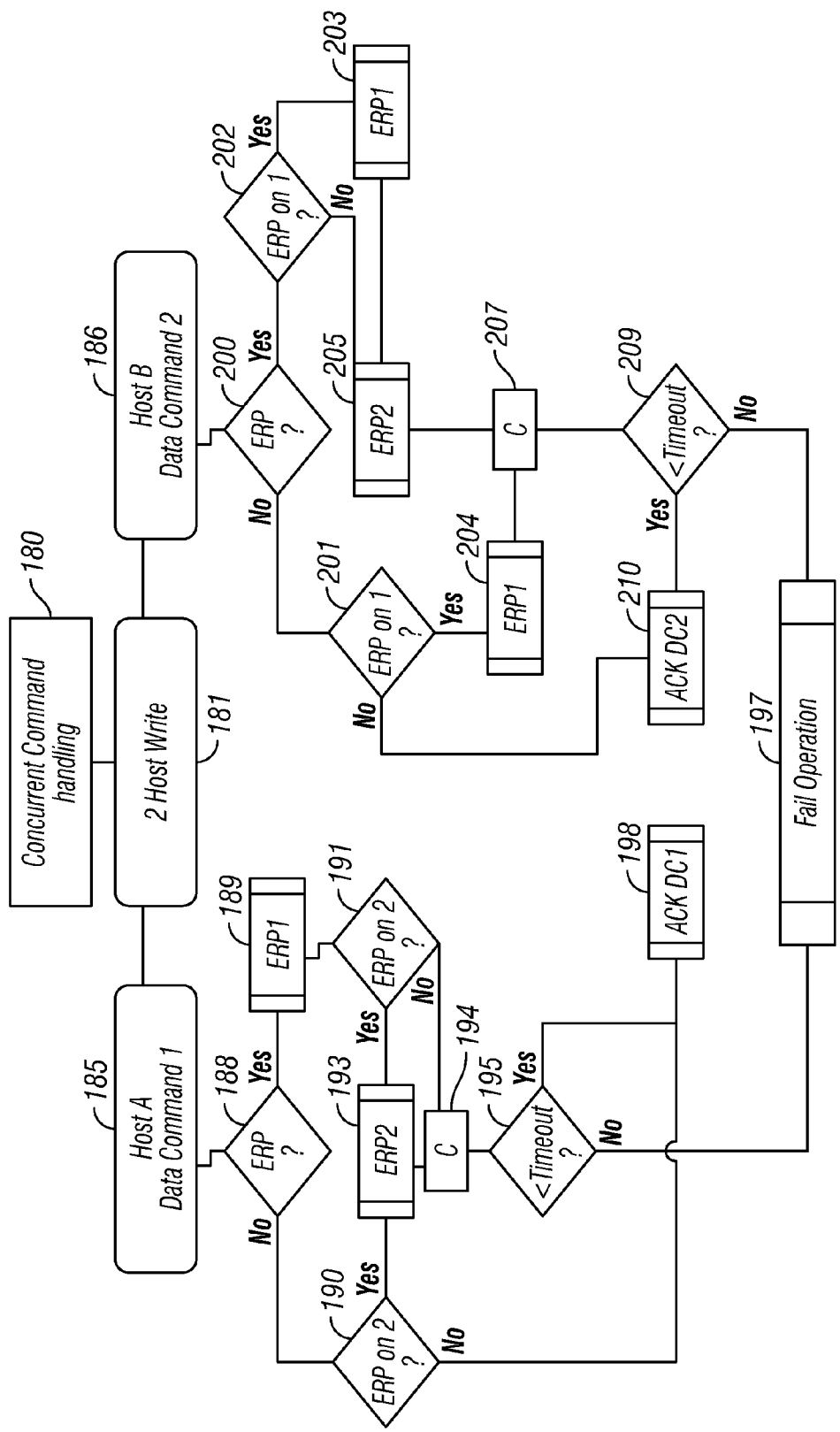
FIG. 8 is a flow chart depicting an exemplary method of operating the system of FIGS. 1 and 2.

Referring to FIG. 8, an error correction procedure (ERP) may occur during the concurrent write operation. Further, the system may be checked for the presence of error correction procedures (ERPs) at a stoppage of data transferring from one of the hosts and a restart. For example, if one buffer partition is empty, the control will continue to write data on the other partition, streaming until data is transferred to the other buffer partition. At the time the other buffer is transferring data, the control will determine if it can start writing without an ERP or if it has to recover to a point on tape that is accessible with an ERP. If it has to recover to a previous position, then the first buffer is held off until both transfers can continue simultaneously. Further, ERPs can happen with respect to either partition of the concurrent write. All commands sent to the drive from the host systems have timeout values. The ERPs are designed to work within the timeout value of a given command. In one embodiment, the control additionally conducts command error recovery failure handling for the buffering and concurrently writing steps based on timeout values for commands of the hosts. For example, concurrent data writes will handle command hold offs based on the timeout value of the command having the shortest timeout period, and will fail the operation if the timeout value cannot be met.

Steps 180 and 181 lead to the 2 host write within the concurrent command handling, and steps 185 and 186 refer respectively to the data command from host A and from host B. The sequences, beginning respectively at step 185 and at step 186, may be conducted with respect to the associated host, or both sequences may be conducted at the same time. Discussing the sequence for host A, channel 1, beginning at step 185, step 188 represents a determination if the host is aware of an ERP with respect to its channel. If so, step 189 determines the time of the wait for completion of the ERP for channel 1. Steps 190 and 191 are the same, shown as separate steps for the purpose of illustration. Step 190 is entered if step 188 indicated that there was no ERP for channel 1, and step 191 is entered if step 188 indicated that there was an ERP for channel 1. Step 190, 191 determines if there is an ERP for channel 2. If so, step 193 determines the time of the wait for completion of the ERP for channel 2. Step 194 combines the times of the waits for completion of the ERPs if both are active, or supplies the time of the wait for the active one of the ERPs. Step 195 compares the wait time from step 194 to the threshold for the command of host A. If the timeout is exceeded, the concurrent write operation is failed in step 197. If the timeout of step 195 is not exceeded, or if there are no ERPs for either channel if indicated at step 190, step 198 indicates that an acknowledgement can be provided for the command of host A.

Similarly, discussing the sequence for host B, channel 2, beginning at step 186, step 200 represents a determination if the host is aware of an ERP with respect to its channel. Steps 201 and 202 are the same, shown as separate steps for the purpose of illustration. Step 201 is entered if step 200 indicated that there was no ERP for channel 2, and step 202 is entered if step 200 indicated that there was an ERP for channel 2. Step 201, 202 determines if there is an ERP for channel 1. Steps 203 and 204 are the same step. If step 201, 202 indicated that there was an ERP for channel 1, step 203, 204 determines the time of the wait for completion of the ERP for channel 1. If step 200 had indicated that there was an ERP for the present channel 2, step 205 determines the time of the wait for completion of the ERP for channel 2. Step 207 combines the times of the waits for completion of the ERPs if both are active, or supplies the time of the wait for the active one of the ERPs. Step 209 compares the wait time from step 207 to the threshold for the command of host B. If the timeout is exceeded, the concurrent write operation is failed in step 197. If the timeout of step 209 is not exceeded, or if there are no ERPs for either channel if indicated at step 201, step 210 indicates that an acknowledgement can be provided for the command of host B.

Thus, if there is an ERP at either or both of the channels, the shortest of the timeouts 198 or 209 determines failure of the concurrent write operation in step 197.

Referring to FIGS. 1 and 2, a person of ordinary skill in the art will appreciate that the embodiments of the present invention, disclosed herein, including the computer-implemented control 20 for operating the tape drive 10 of FIG. 1, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transitory computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for handling data for concurrent writing to a tape, comprising:
    receiving data from two different hosts;
    buffering said received data by at least one buffer in separate buffer space associated with each said host, said separate buffer space adjustably sized in accordance with a data transfer rate of said host associated with said separate buffer space; and
    concurrently transferring data from each of said separate buffer spaces to concurrently write said data from each said host associated with said separate buffer space to a separate parallel partition of said tape using separate dedicated write elements, allowing said hosts to simultaneously write separate data of each said host to said tape.

2. The method of claim 1, wherein said buffer space adjustable sizes are based on expected relative data transfer rates of respective said hosts.

3. The method of claim 2, wherein said expected relative data transfer rates are determined from preceding actual incoming data transfer rates of said hosts.

4. The method of claim 3, wherein said expected relative data transfer rates are determined from a previous portion of said concurrent write operations.

5. The method of claim 4, wherein said determination is made periodically during said concurrent write operations; and said adjustable sizing is conducted as the result of said determination.

6. The method of claim 1, additionally comprising the step of conducting command error recovery failure handling for said buffering and concurrently transferring steps based on timeout values for commands of said hosts.

7. A control for a magnetic tape drive, said magnetic tape drive comprising a magnetic head having multiple sets of transducers; a drive mechanism configured to pass a magnetic tape past said magnetic head; interfaces with respect to two different hosts; at least one buffer configured to buffer data; said control configured to:
 receive data from two different hosts;
 buffer said received data in separate buffer space of said at least one buffer associated with each said host, and adjustably size said separate buffer space for each said host in accordance with a data transfer rate of said host associated with said separate buffer space; and
 concurrently transfer data from each of said separate buffer spaces to concurrently write said data from each said host associated with said separate buffer space with said magnetic head to a separate parallel partition of said magnetic tape using separate dedicated write elements of said magnetic head, allowing said hosts to simultaneously write separate data of each said host to said magnetic tape.

8. The control of claim 7, wherein said buffer space adjustable sizes are based on expected relative data transfer rates of respective said hosts.

9. The control of claim 8, wherein said expected relative data transfer rates are determined from preceding actual incoming data transfer rates of said hosts.

10. The control of claim 9, wherein said expected relative data transfer rates are determined from a previous portion of said concurrent write operations.

11. The control of claim 10, wherein said control makes said determination periodically during said concurrent write operations; and conducts said adjustable sizing as the result of said determination.

12. The control of claim 9, wherein said control additionally conducts command error recovery failure handling for said buffering and concurrently transferring based on timeout values for commands of said hosts.

13. A magnetic tape drive comprising:
 a magnetic head having multiple sets of transducers;
 a drive mechanism configured to pass a magnetic tape past said magnetic head;
 interfaces with respect to two different hosts;
 at least one buffer configured to buffer data; and
 a control configured to:
 receive data from two different hosts at said interfaces;
 buffer said received data in separate buffer space of said at least one buffer associated with each said host, and adjustably size said separate buffer space for each said host in accordance with a data transfer rate of said host associated with said separate buffer space; and
 concurrently transfer data from each of said separate buffer spaces to concurrently write said data from each said host associated with said separate buffer space with said magnetic head to a separate parallel partition of said magnetic tape, allowing said hosts to simultaneously write separate data of each said host to said magnetic tape.

14. The magnetic tape drive of claim 13, wherein said buffer space adjustable sizes are based on expected relative data transfer rates of respective said hosts.

15. The magnetic tape drive of claim 14, wherein said expected relative data transfer rates are determined from preceding actual incoming data transfer rates of said hosts.

16. The magnetic tape drive of claim 15, wherein said expected relative data transfer rates are determined from a previous portion of said concurrent write operations.

17. The magnetic tape drive of claim 16, wherein said control makes said determination periodically during said concurrent write operations; and conducts said adjustable sizing as the result of said determination.

18. The magnetic tape drive of claim 15, wherein said control additionally conducts command error recovery failure handling for said buffering and concurrently transferring based on timeout values for commands of said hosts.

19. A computer program product for a magnetic tape drive, said magnetic tape drive comprising a magnetic head having multiple sets of transducers; a drive mechanism configured to pass a magnetic tape past said magnetic head; interfaces with respect to two different hosts; at least one buffer configured to buffer data; said computer program product comprising non-transitory computer-usable storage medium having computer-usable program code embodied therein for a control computer processor to operate said magnetic tape drive, said computer-usable program code comprising:
 computer-usable program code to receive data from said two different hosts at said interfaces;
 computer-usable program code to buffer said received data in separate buffer space of said at least one buffer associated with each said host, and adjustably size said separate buffer space for each said host in accordance with a data transfer rate of said host associated with said separate buffer space; and
 computer-usable program code to concurrently transfer data from each of said separate buffer spaces to concurrently write said data from each said host associated with said separate buffer space with said magnetic head to a separate partition of said magnetic tape, using separate dedicated write elements of said magnetic head, allowing said hosts to simultaneously write separate data of each said host to said magnetic tape.

20. The computer program product of claim 19, wherein said buffer space adjustable sizes are based on expected relative data transfer rates of respective said hosts.

* * * * *